(12) United States Patent
Lundström

(10) Patent No.: US 6,650,886 B1
(45) Date of Patent: Nov. 18, 2003

(54) TARIFF DETERMINATION IN MOBILE TELECOMMUNICATIONS NETWORKS

(75) Inventor: Johan Lundström, Pargas (FI)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 443 days.

(21) Appl. No.: 09/614,836

(22) Filed: Jul. 12, 2000

(30) Foreign Application Priority Data

Aug. 6, 1999 (GB) ............................................. 9918489

(51) Int. Cl.[7] ............................................. H04M 11/00
(52) U.S. Cl. ........................ 455/406; 455/407; 455/408; 455/432; 455/433; 379/164; 379/121; 379/130
(58) Field of Search ................................ 455/406, 407, 455/408, 432, 433, 560, 422; 379/114, 121, 130

(56) References Cited

U.S. PATENT DOCUMENTS

| | | | | |
|---|---|---|---|---|
| 5,862,471 A | * | 1/1999 | Tiedemann et al. | 455/406 |
| 6,195,543 B1 | * | 2/2001 | Granberg | 455/407 |
| 6,223,042 B1 | * | 4/2001 | Raffel | 455/455 |
| 6,453,030 B1 | * | 9/2002 | Boutwell et al. | 379/114.2 |

FOREIGN PATENT DOCUMENTS

| | | |
|---|---|---|
| GB | 2332342 A | 6/1999 |
| WO | WO 98/59504 | 12/1998 |

OTHER PUBLICATIONS

International Search Report prepared by ISA/EP in connection with PCT/EP00/05721 dated Jan. 11, 2001.
Hughes, G.; UK Patent Office, Patents Act 1977, Search Report Under Section 17, Feb. 8, 2000, App. No. GB 9918489.7, p. 1.

* cited by examiner

*Primary Examiner*—Nay Maung
*Assistant Examiner*—Alan T. Gantt
(74) *Attorney, Agent, or Firm*—Jenkens & Gilchrist, P.C.

(57) ABSTRACT

A method of providing call charge information in a mobile telecommunications system. The method comprises maintaining in a home mobile telecommunications network a set of call charging algorithms which correspond to respective foreign mobile telecommunications networks. The algorithms are transferred periodically to respective foreign networks, wherein the transferred algorithms may be used by the receiving foreign networks to calculate call charge information for subscribers of the home network when they are roaming in the foreign networks.

9 Claims, 2 Drawing Sheets

TARIFF DETERMINATION IN MOBILE TELECOMMUNICATIONS NETWORKS

FIELD OF THE INVENTION

The present invention relates to call tariff determination in mobile telecommunication networks and more particularly to the determination of call tariffs for provision to an access network in respect of a roaming mobile telephone subscriber.

BACKGROUND TO THE INVENTION

In today's competitive mobile telephone market, in order to attract new customers operators are offering a diverse range of payment options. In addition to the conventional payment scheme where a subscriber is billed regularly for telephone calls made over a period immediately preceding the issuing of a bill, there is for example the prepaid card schemes where a user purchases a card and then uses a secret number provided on the card to top-up an account maintained by his operator. The user is able to make and receive calls until such a time as the balance in his account falls to zero. The account must be topped-up using a new prepaid card before the user can make and receive calls once more. Many new services are also being introduced by mobile telephone operators to attract new customers as well as to maintain their existing customer base. One such service which is in limited current use is known as "Advice of Charge" and allows mobile telephone's to be provided with call charge information during the call set-up phase to enable call charges to be computed by the telephone either during or after a call.

In a mobile telecommunications network, there is usually present a node which controls charging for subscribers of that network. This "charging" node maintains details of the tariffs charged by the operator for the complete range of call options, e.g. home mobile telephone to home mobile telephone, home mobile telephone to other national telephones, international tariffs, etc. Providing that a subscriber's telephone is registered with the home network, there is in principal no bar to providing services such as Advice of Charge and to controlling and monitoring in real time prepaid card subscribers and the like, as all the necessary information is available at the home network's charging node (or can be readily obtained by that node). Problems arise however when a mobile telephone subscriber is not at home but rather is registered with some foreign mobile telephone network (the term "access" network is used below to describe the network to which a subscriber is directly connected).

Such a foreign access network will have its own charging node which must be able to determine real time charging information for a roaming subscriber if prepaid subscribers are to be allowed to roam, or if services such as Advice of Charge are to be available to roaming subscribers. Indeed this may be necessary whenever subscribers have a credit ceiling which must not be exceeded.

SUMMARY OF THE INVENTION

The inventor of the present invention has realised that there is at present no mechanism by which a charging node of a foreign network can accurately calculate the tariff to be applied to a roaming subscriber. This is because the tariff is typically made up of a component from the foreign network as well as a component from the subscriber's home network. At present, there is no means by which the foreign network can be made aware of the home network's tariff component.

It is an objective of the present invention to overcome or at least mitigate the above noted disadvantages of existing and currently proposed solutions for enabling a call charging node of a foreign network to determine the call tariff for a roaming mobile subscriber.

According to a first aspect of the present invention there is provided a method of providing call charge information in a mobile telecommunications system, the method comprising:

maintaining in a home mobile telecommunications network a set of call charging algorithms which correspond to respective foreign mobile telecommunications networks; and periodically transferring the algorithms to respective foreign networks, wherein the transferred algorithms may be used by the receiving foreign networks to calculate call charge information for subscribers of the home network when they are roaming in the foreign networks.

It will be appreciated that the terms "home" and "foreign" may be used interchangeably to describe mobile networks, i.e. for some subscribers a network will be a home network whilst for others it will be a foreign network.

Embodiments of the present invention provide charging information required by foreign networks to calculate call charges for roaming subscribers in real time or near real time, whilst requiring only a relatively small volume of inter-network signalling traffic. The volume of signalling traffic is certainly less than would be required, for example, if a charging algorithm were to be transferred for each subscriber or for each call initiated in a foreign network by a roaming subscriber.

The charging algorithm transferred to a foreign network may be used by that network to determine a call tariff for subscribers of the home network. For example, the charging algorithm may comprise a multiplying factor by which the foreign network multiplies its own charge.

Within the home network, said set of call charging algorithms may be maintained at a rating node. The algorithms transferred to the foreign networks may be received by charging nodes of those networks. The charging nodes of the foreign networks may be associated (e.g. co-located) with respective switches. In the case of GSM and UMTS mobile telecommunications networks, these switches may be Mobile Switching Centres (MSCs).

In certain embodiments of the present invention, a charging algorithm is sent to a foreign network upon receipt at the home network of a polling message from the foreign network. Polling messages may be sent by the foreign network at regular intervals. It will be appreciated that a foreign network may have agreements with many other networks, and will poll each of those networks separately to obtain up to date charging algorithms. The foreign network may only pole those networks having a subscriber currently registered with the home network, thus reducing signalling traffic.

In other embodiments of the present invention, the home network may maintain a register of foreign networks (or foreign network charging nodes) with whom it has a roaming agreement. When a new foreign network or foreign network charging node is brought into service, that network or node registers with the home network whereupon the home network transfers the appropriate charging algorithm to the foreign network. The foreign network is notified of subsequent changes to the algorithm.

The home network may maintain for one or more of the charging algorithms maintained by it, a time and date when the receiving foreign network(s) should activate the charging algorithm(s).

The home network may maintain one or more secondary charging algorithms associated with respective ones of said set of charging algorithms, together with respective activation times and dates. The secondary algorithms and the activation times and dates are transferred to the foreign networks together with the primary algorithm. A receiving foreign network will replace the primary algorithm with the secondary algorithm at he activation time and date.

According to a second aspect of the present invention there is provided apparatus for providing call charge information in a mobile telecommunications system, the apparatus comprising:

a rating node for use in a home mobile telecommunications network and arranged to maintain a set of call charging algorithms which correspond to respective foreign mobile telecommunications networks;

charging nodes for use in respective foreign networks to calculate call charges for subscribers of the home network roaming in the foreign networks; and transfer means associated with said rating node for periodically transferring the algorithms to respective foreign network charging nodes, wherein the transferred algorithms may be used by the receiving foreign networks to calculate call charge information for said roaming subscribers.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF CERTAIN EMBODIMENTS

Figure 1:
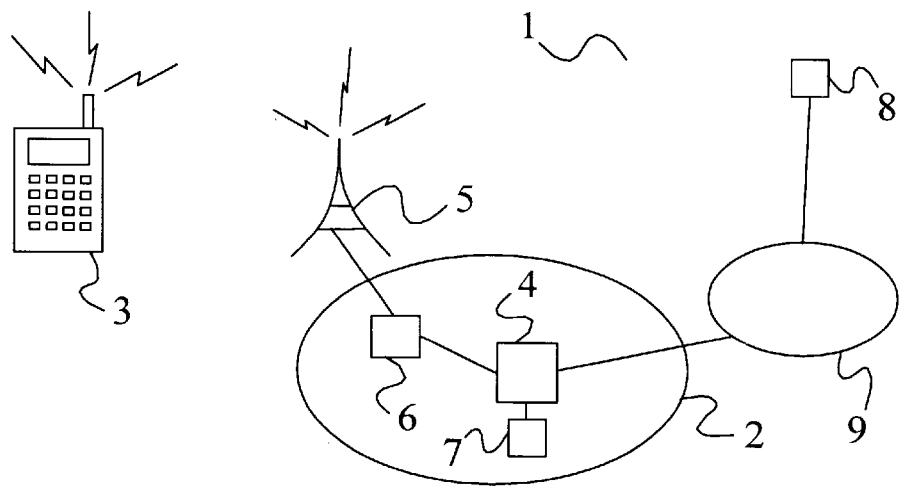
FIG. 1 illustrates schematically a telecommunication system.

There is illustrated in FIG. 1 a telecommunications system comprising a number of mobile telephone networks 1, 2. A first of the networks 1 is a mobile telephone network (e.g. using the proposed UMTS standard) and represents a home network to which a notional mobile telephone user subscribes. The network 1 is therefore responsible for charging this notional subscriber either by way of issuing bills for previous calls made, or by debiting a prepaid account held by the subscriber.

FIG. 1 also shows a second UMTS mobile telephone network 2 and a mobile telephone 3 owned by the notional subscriber (it is assumed that the subscriber has inserted his Subscriber Identity Module (SIM) card into the telephone). Assuming that the subscriber has left his home network 1 and has roamed into the coverage area of the foreign network 2, the terminal 3 registers with the foreign network 2 using the information stored in the SIM card. Subsequently, in order to set up a call, the terminal 3 makes contact with a Mobile Switching Centre (MSC) 4 of the foreign network via a Base Station 5 and a Base Station Controller 6. The foreign network's MSC 4 controls the routing of a call from the terminal 3 to the called B-number and in addition acts as a charging node 7 for the foreign network, collecting charging information during a call and subsequently relaying this to a charging node of the home network 1 following termination of the call. The foreign network's charging node 7 maintains the call tariffs applied by the foreign network 2 for a variety of calls, e.g. local, national, and international.

A rating node 8 is provided in the subscriber's home network 1 and maintains details of the tariffs of the home network 1. More particularly, the rating node maintains a charging algorithm for each foreign network with which the home network 1 has a roaming agreement. Assume for example that the home network applies an administrative fee of 5% over and above the call tariff of a given foreign network, as well as a 22% VAT element, the charging algorithm maintained for that foreign network will be a multiplication factor of 1.27. It will be appreciated that as the number of foreign networks with which the home network has a roaming agreement is relatively small, the number of charging algorithms maintained by the rating node 8 will be correspondingly small. It will also be appreciated that charging algorithms may be updated from time to time by the operator of the home network 1.

Figure 2:
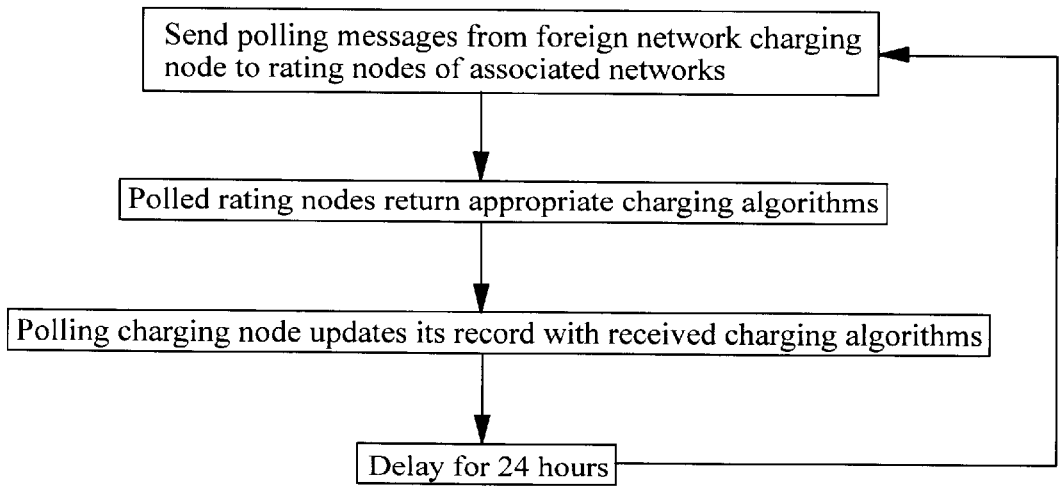
FIG. 2 is a flow diagram illustrating a caller tariff determination method used in the system of FIG. 1.

FIG. 2 is a flow diagram illustrating a method by which charging algorithms maintained by the rating node 8 within the home network 1 may be distributed to charging nodes of respective foreign networks 2. The charging node(s) 7 of each (foreign) network 2 regularly polls the rating node 8 of the home network 2 (as well as rating nodes of other networks with which they have a roaming agreement). For example, polling may be carried out once every 24 hours.

Upon receipt of a polling message, the rating node 8 returns to the polling charging node 7 the charging algorithm appropriate for that charging node. If the charging algorithm has not changed, this fact may be notified to the polling charging node 7. Charging algorithms may be time and date stamped (using for example Greenwich Mean Time) so that they are only activated at the polling node at the stated time and date. To reduce the volume of charging related signalling traffic, a charging node 7 of a foreign network may only poll those networks with which the foreign network has a roaming agreement and for whom there is currently registered with the foreign network a roaming subscriber. In addition to the regular polling message, the foreign network may issue a one-off polling message when a roaming subscriber registers with the network and there are no subscribers having the same home network already registered with the foreign network.

Figure 3:
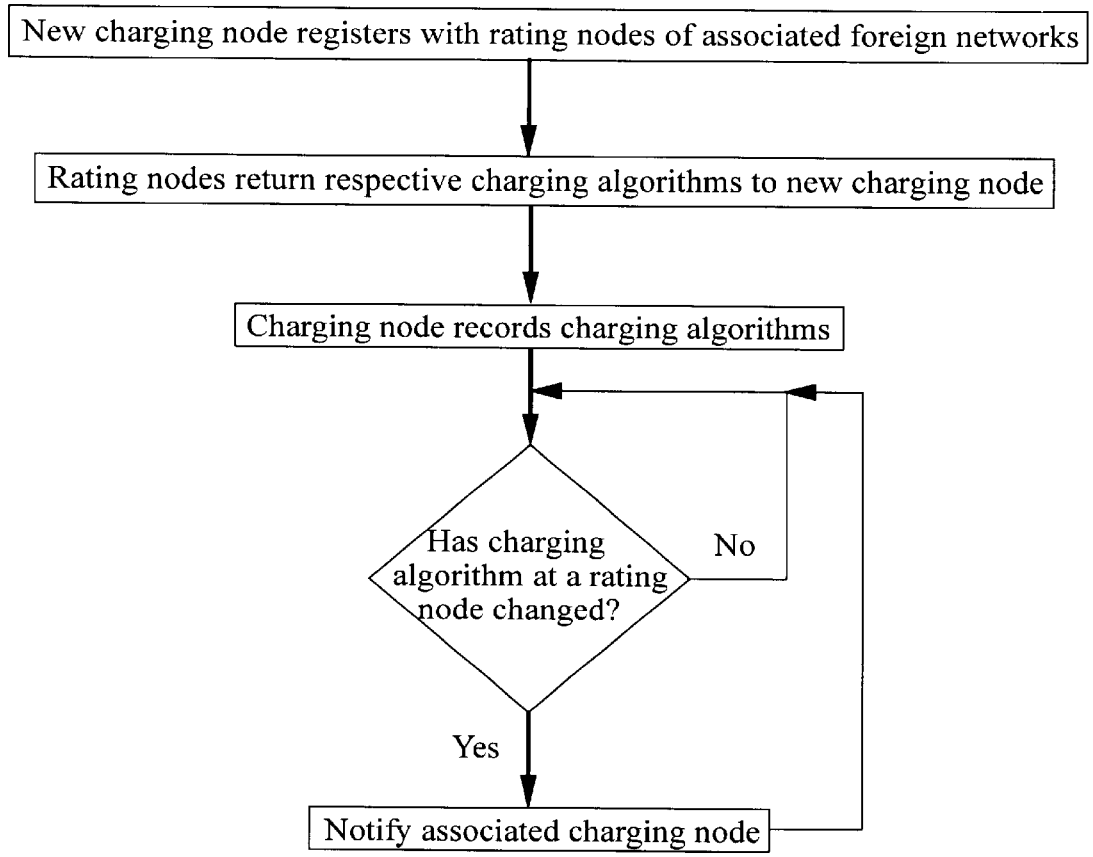
FIG. 3 is a flow diagram illustrating an alternative caller tariff determination method used in the system of FIG. 1

FIG. 3 is a flow diagram illustrating an alternative method by which charging algorithms maintained by the rating node 8 within the home network 1 may be distributed to charging nodes 7 of respective foreign networks 2. Whenever a new charging node 7 is brought in to service, that node "registers" with the rating nodes 8 of other networks with which it has a roaming agreement. In the event of a successful registration, a rating node 8 will return the appropriate charging algorithm to the new charging node 7. When a charging algorithm held by a rating node 8 is changed, the new charging algorithm is sent to the appropriate charging node(s). Again, charging algorithms may be time and date stamped to indicate when the algorithm should be activated.

A number of possible mechanisms exist for transferring polling, notification, and other charging algorithm related message between mobile telecommunications networks. For example, messages may be sent using the Mobile Application Part (MAP) protocol, the Intelligent Network Application Part (INAP) protocol, or Camel Application Protocol (CAP).

It will be appreciated by the person of skill in the art that various modifications may be made to the above described embodiment without departing from the scope of the present invention. For example, a given network may contain one or a number of charging nodes. A network may also comprise a single, centralised rating node, or a number of distributed rating nodes.

What is claimed is:

1. A method of providing call charge information in a mobile telecommunications system, the method comprising:

maintaining in a home mobile telecommunications network a set of call charging algorithms which correspond to respective foreign mobile telecommunications networks; and periodically transferring the algorithms to respective foreign networks, wherein the transferred algorithms are used by the receiving foreign networks to calculate call charge information for subscribers of the home network when they are roaming in the foreign networks.

2. A method according to claim 1, wherein the charging algorithm comprises a multiplying factor by which the foreign network multiplies its own charge.

3. A method according to claim 1, wherein said set of call charging algorithms are maintained at a rating node of the home network.

4. A method according to claim 1, wherein the algorithms transferred to the foreign networks are received by charging nodes of the foreign networks.

5. A method according to claim 3, wherein the charging nodes of the foreign networks are associated with respective switches.

6. A method according to claim 1, wherein a charging algorithm is sent to a foreign network upon receipt at the home network of a polling message from the foreign network.

7. A method according to claim 1, wherein the home network maintains a register of foreign networks or foreign network charging nodes with whom it has a roaming agreement and notifies those foreign networks or foreign network charging nodes of changes in associated charging algorithms.

8. A method according to claim 1, wherein the charging algorithms sent to the foreign networks are stamped with an activation time and date.

9. Apparatus for providing call charge information in a mobile telecommunications system, the apparatus comprising:

a rating node for use in a home mobile telecommunications network and arranged to maintain a set of call charging algorithms which correspond to respective foreign mobile telecommunications networks;

charging nodes for use in respective foreign networks to calculate call charges for subscribers of the home network roaming in the foreign networks; and transfer means associated with said rating node for periodically transferring the algorithms to respective foreign network charging nodes;

wherein the transferred algorithms are used by the receiving foreign networks to calculate call charge information for said roaming subscribers.

\* \* \* \* \*